Aug. 28, 1956     G. HARTZELL     2,760,782
GOLF CART WITH WHEEL AND HANDLE MECHANISM
FOLDABLE WITHIN THE BAG THEREOF
Filed June 9, 1955                          2 Sheets-Sheet 2
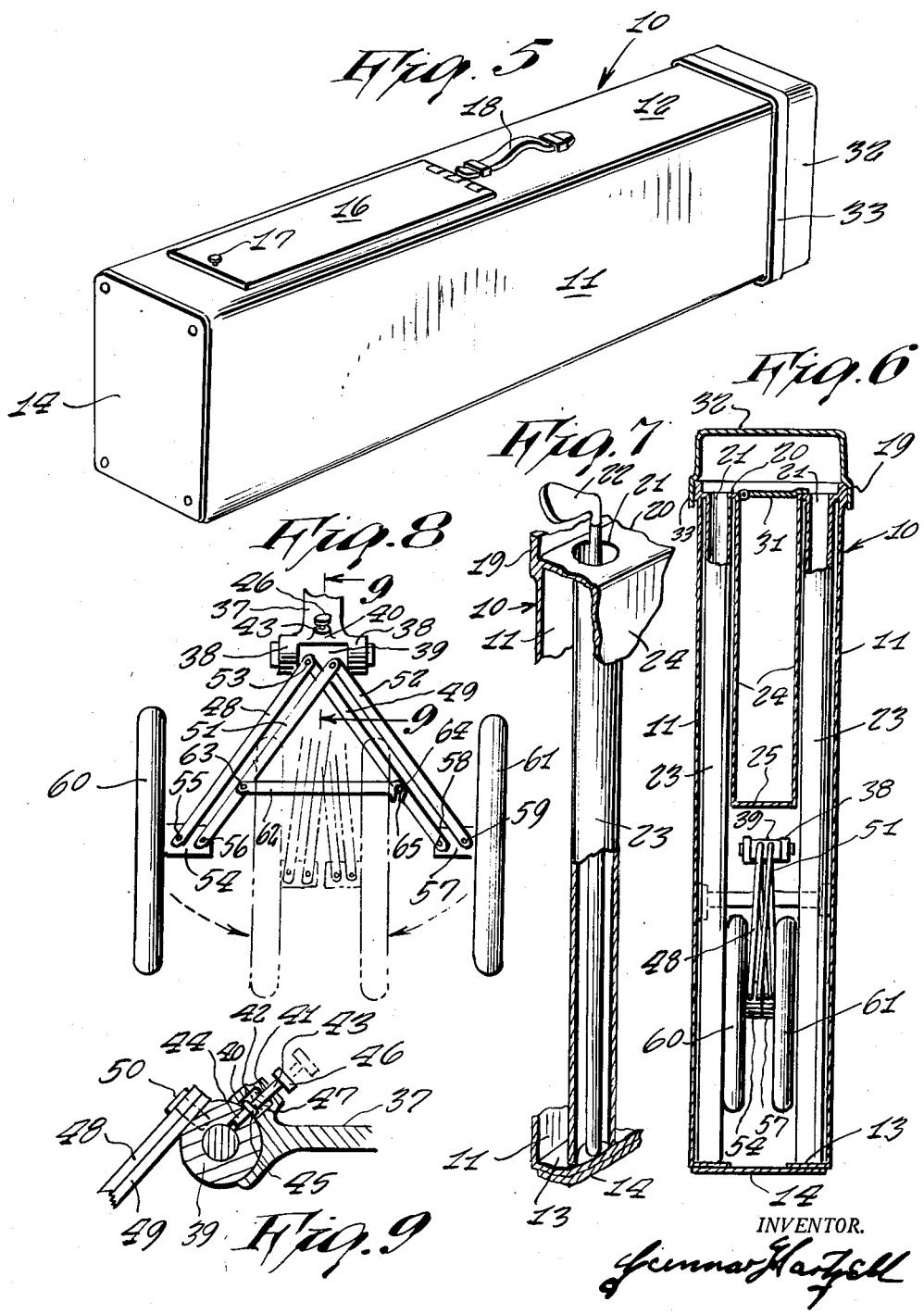
INVENTOR.
Gunnar Hartzell

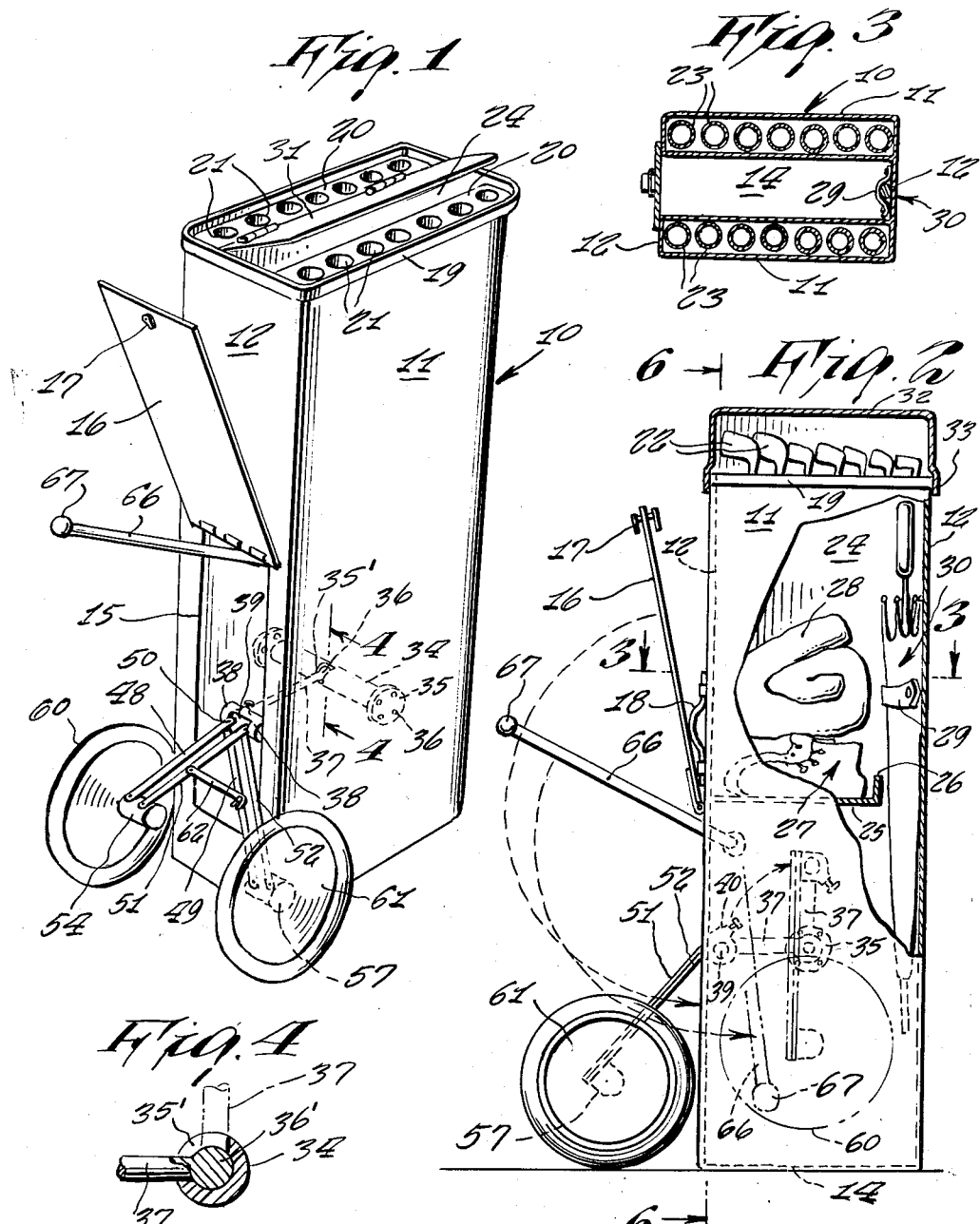

United States Patent Office 2,760,782
Patented Aug. 28, 1956

2,760,782

GOLF CART WITH WHEEL AND HANDLE MECHANISM FOLDABLE WITHIN THE BAG THEREOF

Gunnar Hartzell, Chicago, Ill.

Application June 9, 1955, Serial No. 514,229

8 Claims. (Cl. 280—36)

This invention relates to golf carts.

It is an object of the present invention to provide a golf cart which represents an all-in-one unit, carrying all the necessary clubs, a pair of shoes, a golf jacket, golf balls and an umbrella.

It is another object of the present invention to provide a golf cart of the above type which is self-contained and which eliminates the necessity of strapping the conventional golf bag onto the conventional cart, effecting an economy of time on the part of the golfer.

It is still another object of the present invention to provide a golf cart of the above type wherein the golf cart is built into the bag and wherein the entire assembly may be collapsed into a compact, portable unit resembling a carrying case.

Other objects of the invention are to provide a golf cart having the above objects in mind which is of simple construction, has a minimum number of parts, is inexpensive to manufacture and efficient in operation.

For other objects and a better understanding of the invention, reference may be had to the following detailed description taken in connection with the accompanying drawing, in which:

Figure 1 is a perspective view of a preferred embodiment of the present invention showing the same in operative use;

Fig. 2 is a side view thereof shown partly in elevation and partly in section and illustrating in phantom the retracted position of the wheels and handle;

Fig. 3 is a transverse sectional view taken along the line 3—3 of Fig. 2;

Fig. 4 is a fragmentary vertical sectional view taken along the line 4—4 of Fig. 1;

Fig. 5 is a perspective view of the invention showing the golf cart assembly in the retracted position and the unit adapted for easy carrying;

Fig. 6 is a vertical sectional view thereof taken along the line 6—6 of Fig. 2 and showing the wheels and handle in the retracted position;

Fig. 7 is a fragmentary perspective view shown partly in section of one of the golf holding tubes;

Fig. 8 is a front elevational view of the wheel assembly shown in the operative position and illustrating in phantom the retracted position thereof; and Fig. 9 is a vertical sectional view taken along the line 9—9 of Fig. 8.

Referring now more in detail to the drawing, 10 indicates generally a rigid rectangular golf bag of aluminum or other light weight material including the side walls 11 and the end walls 12, substantially as illustrated.

As shown in Figs. 6 and 7, the side walls 11 at their lower edges are integrally formed with the flanges 13 across the bottom of which is secured the bottom wall 14.

One of the end walls 12 is provided with the elongated opening 15 across which is hingeably secured the cover plate 16, the plate 16 being retained in the closed position by means of the latch element 17.

A flexible strap handle 18 is suitably secured to the end wall 12 at the center thereof above the cover plate 16, as shown in Fig. 5.

As shown in Figs. 1 and 6, the open upper end of the bag is integrally formed with the thickened flange portion 19 to which is secured a pair of oppositely disposed elongated plates 20 in laterally spaced relationship to each other, each of the plates 20 being provided with a plurality of longitudinally spaced circular openings 21 adapted to receive the clubs 22 downwardly therethrough.

Aluminum tubes 23 are secured to the undersurface of the plates 20 in vertical alignment with the openings 21, the lower ends of the tubes 23 being secured to the flanges 13 whereby to provide separate compartments for the handles of each of the clubs.

As shown in Figs. 6 and 7, the inner spaced edges of the plates 20 are integrally formed with the depending inner side walls 24 integrally formed at their lower edges with the partial bottom wall 25. It will be noted (Fig. 2) that the partial bottom wall 25 terminates in spaced relationship to one of the outer side walls or end walls 12 in the upwardly extending flange 26 and supports thereon the pair of shoes 27 and the golf jacket 28. A strap 29 is secured across the end wall 12 on the inside thereof above the flange 26 and serves to mount therewithin the umbrella 30, the lower end of the umbrella extending downwardly past the partial bottom wall 25 into the lower portion of the bag 10. A hinged cover plate 31 is provided (Figs. 1 and 6) and encloses the inner compartment formed by the inner side walls 24 and the partial bottom wall 25. Golf balls, not shown, may also be supported on the bottom wall 25 along with the shoes and the jacket.

A removable cover 32 is provided for the upper end of the golf bag and is integrally formed with a depending outwardly offset skirt 33 which is snapped onto the flange 19 of the bag.

As shown in Fig. 1, a hollow cylindrical bearing member 34 is secured transversely within the bag by means of the end flanges 35 and bolts or screws 36, the bearing member 34 and its central portion having an arcuate cutout 35' which extends through substantially ninety degrees (Fig. 4). A shaft 36' is rotatably mounted within the bearing member 34 and is integrally formed with a forwardly extending arm 37 disposed at right angles thereto and which is adapted to rotate through ninety degrees within the slot 35, the arm 37 being supported in the horizontal position by the lower end of the slot 35 when in the extended position of Fig. 1.

As shown in Figs. 8 and 9, the forward or outer end of the arm 37 is integrally formed with the bifurcated bearing members 38 which rotatably mount the transverse shaft 39. In order to lock the position of the shaft 39 within the bearing members 38, the bifurcated portion is integrally formed within the hub 40 having a first bore 41 and a second enlarged bore 42 (Fig. 9). A pin 43 is slidable through bores 41 and 42 and is adapted to extend into an opening 44 provided in the shaft 39. The downward displacement of the pin 43 into the opening 44 is limited by a shoulder 45 carried by the pin, the other end of the pin being provided with the enlarged head 46 to facilitate the movement thereof. A coil spring 47 surrounds the pin 43 intermediate the shoulder 45 and the upper end of the hub and serves to retain the pin in the position of Fig. 9.

A first pair of links 48 and 49 are pivotally connected at their inner ends to the shaft 39 by means of a rivet 50 or pin while a second pair of links 51 and 52 are pivotally connected to the shaft 39 by means of the pin or rivet 53.

The other ends of the links 48 and 51 are pivotally connected to the bearing member 54 by means of the pins 55 and 56, respectively, while the other ends of the links 52 and 49 are pivotally connecting to the bearing member 57 by means of the pins 58 and 59, respectively. The bearing members 54 and 57 serve to rotatably mount the rubber rimmed wheels 60 and 61, respectively.

The links are retained in the operative position of Fig. 8 by means of a link 62 pivotally connected to the link 51 by means of the pin 63, the link 62 being formed with an enlarged hook end 64 which engages a pin 65 fixedly carried by the link 49.

A pull handle 66 terminating in the enlarged knob 67 is pivotally mounted at its inner end within the upper end of the opening 15 and is adapted to be rotated downwardly to the position shown in phantom in Fig. 2 when not in use.

When it is desired to collapse the unit into the portable carrying bag of Fig. 5, it is only necessary to rotate the link 62 away from pin 65 to permit the links 48, 49, 51, 52 to rotate together to the position of Fig. 6. The pin 43 is then removed from the opening 44 in shaft 39 against the action of the coil spring 47 to permit the shaft 39 to be rotated in a counter-clockwise direction, bringing the links and wheels toward the arm 37, which latter is then rotated upwardly to the dotted line position of Fig. 4, bringing the wheels into the bag in the compact disposition shown in phantom in Fig. 2. The cover plate 16 is then lowered and locked by means of the latch 17, whereupon the cover 32 is then placed on the upper end of the bag to permit the same to be carried, as shown in Fig. 5.

To set the golf cart up for use, it is only necessary to reverse the above operations to reach the assembly of Fig. 1. During the collapsing of the wheels and links, the pull handle 66 is rotated downwardly into the bag to the dotted line position of Fig. 2, as will be obvious.

While various changes may be made in the detail construction, it shall be understood that such changes shall be within the spirit and scope of the present invention as defined by the appended claims.

What I claim as new and desire to protect by Letters Patent of the United States is:

1. A portable combination golf bag and cart comprising a rigid bag, retractable wheel assembly means mounted within the bottom of said bag, a pair of laterally spaced plates at the upper open end of said bag, each of said plates having longitudinally spaced openings adapted to receive the golf clubs downwardly therethrough, a plurality of tubular elements secured to the undersurface of said plates in vertical alignment with said openings whereby to provide independent storage compartments for each of the golf clubs, a central compartment intermediate said plates adapted to contain golf shoes or the like, said central compartment having a reduced bottom wall disposed above said wheel assembly within the bottom of the bag, mounting means above said reduced bottom wall and out of alignment therewith adapted to contain an umbrella or the like and removable cover means for the upper end of said bag, and a handle secured to one end wall of said bag for portability.

2. A portable combination golf bag and cart according to claim 1, said retractable wheel assembly means comprising said golf bag having at said end wall near the bottom thereof a vertically enlongated opening therethrough, a transverse bearing member secured to the inside of said bag within said opening, said transverse bearing member having an opening extending through ninety degrees, a shaft rotatably mounted within said bearing member and fixedly carrying a forwardly extending arm adapted to rotate through ninety degrees from a horizontal to a vertical position within said slot, a bifurcated portion at the forward end of said arm rotatably mounting a second shaft, means for locking the position of said shaft within said bifurcated portion, a first pair of links pivotally connected at their inner ends to said shaft, a second pair of links pivotally connected to said shaft at their inner ends, a bearing member pivotally connected to two of said links, a second bearing member pivotally connected to the other two of said links, means for retaining said links in angularly spaced relationship, and wheels rotatably mounted on each of said bearing members.

3. A combination golf bag and cart according to claim 2, said means for locking said second shaft relative to said bifurcated portion comprising a hub integrally formed in said bifurcated portion having a first bore and a second enlarged bore therebelow, a pin slidable through said first and second bores, said shaft having an opening adapted to receive said pin therewithin, said pin having a shoulder whereby to limit its displacement into said shaft, a coil spring sleeved about said pin intermediate said shoulder and the upper end of said hub within said enlarged bore, said pin having enlarged head.

4. A portable combination golf bag and cart according to claim 3, said means for retaining said two pair of links in spaced relationship comprising a link pivotally connected to one of said links and terminating in a hooked end, and a pin fixedly carried by the other of said links adapted to be engaged by said hooked end.

5. A portable combination golf bag and cart according to claim 4, said handle means comprising a pull rod pivotally connected within said opening to the inside of said bag and terminating in an enlarged knob, said rod being rotatable downwardly within said opening for retraction within the bag, said bag also including a cover plate pivotally mounted at the upper end of said bag opening, a latch means carried by the other end of said cover plate for locking the same in a closed position when the wheel assembly is retracted along with the pull handle.

6. A portable combination golf bag and cart according to claim 5, said handle comprising a flexible strap mounted on said bag adjacent the pivoted end of said cover plate.

7. A portable combination golf bag and cart according to claim 6, said plates at their inner ends having depending inner side walls forming an inner compartment, said side walls being connected by a bottom wall at their lower edges terminating short of the other end wall and said bottom wall having an upwardly extending flange.

8. A portable combination golf bag and cart according to claim 7, including a cover plate pivotally connected to the inner end of one of said plates and extending to the inner end of the other of said plates adapted to close said central compartment.

References Cited in the file of this patent

UNITED STATES PATENTS

| | | |
|---|---|---|
| 1,600,601 | Sampson | Sept. 21, 1926 |
| 1,951,492 | Schneider | Mar. 20, 1934 |
| 2,564,828 | Alexander | Aug. 21, 1951 |
| 2,590,178 | Jamison | Mar. 25, 1952 |
| 2,699,951 | Gans | Jan. 18, 1955 |